US010640056B2

(12) United States Patent
Marschall et al.

(10) Patent No.: US 10,640,056 B2
(45) Date of Patent: May 5, 2020

(54) COMPONENT SYSTEM FOR FIXING A TRIM PART AND MOTOR VEHICLE

(71) Applicant: Volkswagen Aktiengesellschaft, Wolfsburg (DE)

(72) Inventors: Uwe Marschall, Wolfsburg (DE); Michaela Grobe, Osloss (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 58 days.

(21) Appl. No.: 16/133,077

(22) Filed: Sep. 17, 2018

(65) Prior Publication Data
US 2019/0084500 A1 Mar. 21, 2019

(30) Foreign Application Priority Data
Sep. 15, 2017 (DE) .......................... 10 2017 216 430

(51) Int. Cl.
*B60R 13/02* (2006.01)
(52) U.S. Cl.
CPC ........ *B60R 13/0206* (2013.01); *B60R 13/025* (2013.01); *B60R 13/0212* (2013.01); *B60R 2013/0293* (2013.01)
(58) Field of Classification Search
CPC ........ B62D 25/04; B62D 25/06; B60R 13/02; B60R 13/0206; B60R 13/0212; B60R 13/0225; B60R 13/025; B60R 2013/0293
USPC .................................................. 296/210, 214
See application file for complete search history.

(56) References Cited

U.S. PATENT DOCUMENTS

| | | | |
|---|---|---|---|
| 6,095,593 A | * | 8/2000 | Johann .................... B60R 13/02 296/187.05 |
| 7,059,629 B2 | | 6/2006 | Takahara |
| 7,621,556 B2 | | 11/2009 | Itakura |
| 7,837,224 B2 | | 11/2010 | Benkler et al. |
| 8,033,569 B2 | | 10/2011 | Yamanishi et al. |
| 8,408,586 B2 | | 4/2013 | Ohmori et al. |
| 8,899,671 B2 | | 12/2014 | Huelke |
| 9,505,356 B2 | * | 11/2016 | Migaki .................... B60R 13/02 |
| 9,505,856 B1 | | 11/2016 | Migaki |
| 2004/0256843 A1 | * | 12/2004 | Totani ................... B60R 21/213 280/730.2 |

(Continued)

FOREIGN PATENT DOCUMENTS

DE           8203067 U1    8/1982
DE   102004026544 A1   12/2005
(Continued)

*Primary Examiner* — Gregory A Blankenship
(74) *Attorney, Agent, or Firm* — Muncy, Geissler, Olds & Lowe, P.C.

(57) ABSTRACT

A component system for fixing a trim part in a defined position as well as a motor vehicle, in particular a passenger car, is provided. The component system has a trim part that is to be fixed in relation to a motor vehicle body component, in particular a headliner, a trim support for supporting the trim part as well as a counter-pressure device for applying a first force to a first area of the trim part. At least one section of the trim support is disposed on a side of the first area opposite the counter-pressure device for applying a second force oriented in an opposite direction from the first force to the first area. A second area of the trim part is disposed on the side of the trim support opposite the first area and thus forms a visible side of the trim part.

11 Claims, 2 Drawing Sheets

(56) References Cited

U.S. PATENT DOCUMENTS

| | | | |
|---|---|---|---|
| 2005/0231006 A1* | 10/2005 | Pfeffer | B60R 13/0231 296/214 |
| 2008/0093830 A1* | 4/2008 | Takezawa | B60R 13/02 280/751 |
| 2008/0251667 A1* | 10/2008 | Swayne | B60R 13/0206 248/220.31 |
| 2008/0265629 A1* | 10/2008 | Fry | B60R 11/02 296/214 |
| 2011/0133522 A1* | 6/2011 | Kring | B60R 13/0225 296/214 |
| 2011/0291439 A1* | 12/2011 | Iwasaki | B60R 13/0243 296/146.7 |
| 2016/0001714 A1* | 1/2016 | Migaki | B60R 13/0237 296/193.05 |
| 2017/0334370 A1* | 11/2017 | Miyashita | B32B 7/05 |
| 2019/0084500 A1* | 3/2019 | Marschall | B60R 13/0206 |

FOREIGN PATENT DOCUMENTS

| | | |
|---|---|---|
| DE | 102004028513 A1 | 12/2005 |
| DE | 102006053990 A1 | 5/2007 |
| DE | 602004000953 T2 | 5/2007 |
| DE | 102006055507 A1 | 6/2008 |
| DE | 102009011017 A1 | 10/2009 |
| DE | 102008032660 A1 | 1/2010 |
| DE | 102008047461 A1 | 4/2010 |
| DE | 112011100680 T5 | 3/2013 |
| DE | 102014204236 A1 | 9/2014 |
| DE | 102015203035 A1 | 8/2016 |
| DE | 102015216526 A1 | 3/2017 |
| EP | 2151360 A1 | 2/2010 |
| JP | H 09-277888 A | 10/1997 |
| JP | 2002-370603 A | 12/2002 |
| JP | 2005-014633 A | 1/2005 |
| JP | 2016-013765 A | 1/2016 |

* cited by examiner

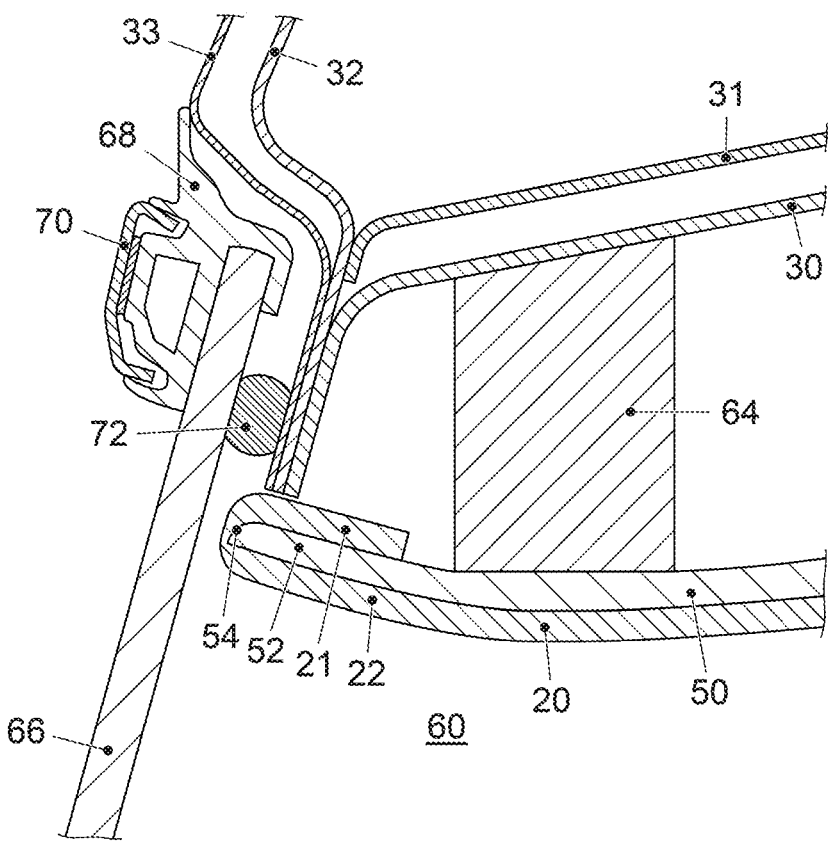
FIG. 1    (Conventional Art)
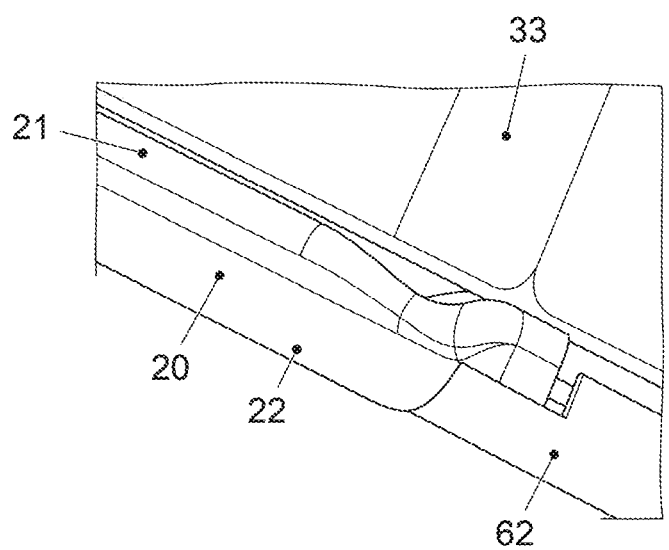
FIG. 2    (Conventional Art)

COMPONENT SYSTEM FOR FIXING A TRIM PART AND MOTOR VEHICLE

This nonprovisional application claims priority under 35 U.S.C. § 119(a) to German Patent Application No. 10 2017 216 430.1, which was filed in Germany on Sep. 15, 2017, and which is herein incorporated by reference.

BACKGROUND OF THE INVENTION

Field of the Invention

The present invention relates to a component system for fixing a trim part in a defined position as well as a motor vehicle, in particular a passenger car.

Description of the Background Art

A clean and uniform joint pattern is a mark of quality of the interior trim of motor vehicles. In particular, visible gaps must be minimized and designed in such a way that their appearance is precise, uniform and independent of external influences such as temperature or humidity. This is important, for example, at the joints between column trim and roof lining, also referred to as headliners. The trim parts in question are typically manufactured from flexible materials and therefore are movable within certain limits in relation to the vehicle body under the influence of external forces.

One way to implement a uniform joint pattern or to minimize the gap between the parts in question is to use spacers, which may be made from foam material, for example. These spacers are situated, for example, between vehicle body components and trim parts and are used as stop elements to prevent a displacement of the trim part. The disadvantage is the need for additional components, which may result in extra complexity during design and manufacture, on the one hand, and in assembly, on the other hand. Moreover, this approach is not always suitable for minimizing the size of the gap, as is required, for example if greater distances between the spacers and the visible gap are necessary, due to the design, so that deformation of the flexible trim parts occurs, or if the flexible material allows the spacers themselves to undergo excessive deformation.

Individual aspects of this approach known from the conventional art are illustrated in FIGS. 1 and 2. FIG. 1 shows a section of the side connecting area of a trim part 20, namely a headliner, on motor vehicle body components 30, 31, 32, 33. The section runs perpendicularly to the longitudinal extension direction of the C pillar, viewed in the direction counter to the direction of travel of the motor vehicle, and shows the right side or passenger's side of the motor vehicle.

At the illustrated position, the motor vehicle shell comprises an inner side part 30, an inner rear side part 31, a rear connecting part 32 and an outer side part 33. Together, they form part of the roof structure. In the outer area shown on the left, a sealing strip 68 partially faced with an outer molding 70 abuts outer side part 33. It holds side window 66, which is fastened to outer side part 33 with the aid of an adhesive bead 72.

Outer side part 33, rear connecting part 32 and inner side part 30 run in parallel to each other in their lower areas and end in a shared front side, under which a gap having a thickness of approximately 0.5 mm is situated.

Trim part 20, namely the headliner of the motor vehicle, is held by a trim support 50. The headliner is the interior roof lining of the motor vehicle, which delimits motor vehicle interior 60 in the upward direction. Trim part 20 is bent around periphery 54 of trim support 54 on the end facing outwardly in the direction of side window 66 in such a way that a first area 21 of trim part 20 is above corresponding section 52 of trim support 50, and a second area 22 of trim part 20 is below section 52. First area 21 of trim part 20 forms the lower periphery of the gap limited in the upward direction by vehicle body components 30, 32 and 33.

To fix trim support 50 and thus trim part 20 in a defined position in relation to inner side part 30, a spacer 64 manufactured from a foam material is disposed between said inner side part 30 and trim support 50. The spacer has a height of 32 to 36 mm, a width of 25 mm and a depth of 35 mm. It is apparent that at least one spacer must be used on each side of the vehicle to fix the defined position of trim part 20 on both sides.

FIG. 2 shows the pattern resulting from the described structure at the joint between trim part 20 and pillar trim 62, the trim of the C pillar in this case. Viewed from the outside through the side window in the direction of the right side or driver's side of a motor vehicle having the structure described above, the bent area of trim part 20 is shown from the outside. First area 21 of trim part 20 is at the top and second area 22 thereof is situated therebeneath. The described gap is apparent between upper first area 21 and the motor vehicle shell, namely outer side part 33.

On the right side, it is apparent that trim part 20 bent around the trim support is inserted into pillar trim 62 or is held thereby. A gap resulting from an improperly engaged detent lug is visible between pillar trim 62 and trim part 20. This is the case because trim part 20, the headliner, is not held firmly enough in the desired position by to the flexible spacer (cf. FIG. 1), or it is not adequately secured against springing upward and therefore is situated in too high a position. In this manner, the illustrated gap occurs between trim part 20 and pillar trim 62, and the detent connection cannot be established.

Another way to implement a uniform joint pattern is to reinforce trim parts in question, the mobility of the trim part being reduced by the associated rigidity. This is disadvantageous with respect to the space requirements and the weight of the particular parts.

It is also possible to use sealing foams between the relevant parts or Keder strips to connect the parts. However, this entails considerably more complexity in manufacturing as well as high additional costs.

DE 10 2006 053 990 A1, which corresponds to U.S. Pat. No. 7,621,556, describes a structure for fastening an interior trim panel to a vehicle A pillar. A space extends from the inside of an A pillar trim panel to the inside of a roof lining, an airbag being disposed in the space. A latching tab is disposed in the structure, which faces in almost the same direction as the deployment direction of the airbag. The latter is mounted on a part situated next to a connecting part of the A pillar trim panel and the roof lining and extends along the door opening of a vehicle body metal sheet on the inside of the front column trim panel. The latching tab is mounted in an area from an edge part of a door opening to the inside of the vehicle compartment. A corresponding engagement part, oriented in the opposite direction, is located on the back of an end edge part on the door opening side of the A pillar trim panel. A rim panel holder prevents a gap from forming between the A pillar trim panel and the roof lining.

DE 11 2011 100 680 B4, which corresponds to U.S. Pat. No. 8,408,586, discloses a curtain airbag device for a vehicle, which comprises a curtain airbag main body oriented along a longitudinal direction of the vehicle body, which is covered by a pillar trim and a roof lining. The curtain airbag main body is furthermore folded in a front or rear pillar part and a roof side rail part of the vehicle body to be able to deploy downwardly in a passenger compartment. The curtain airbag device furthermore comprises a fastening element which fastens the pillar trim to the pillar part.

SUMMARY OF THE INVENTION

It is therefore an object of the present invention to provide a component system as well as a motor vehicle comprising a component system, with the aid of which the fixing of a trim part in a defined position may be implemented in an easy, permanent and cost-effective manner.

In an exemplary embodiment of the invention, a component system is provided for fixing a trim part in a defined position. It comprises a trim part to be fixed in relation to a motor vehicle body component, for example, a headliner, a trim support for supporting the trim part as well as a counter-pressure device for applying a first force to a first area of the trim part. At least one section of the trim support is disposed on the side of the first area of the trim part opposite the counter-pressure device for the purpose of applying a second force oriented in the opposite direction from the first force to the first area of the trim part. A second area of the trim part is disposed on the side of the trim support opposite the first area of the trim part and thus forms a visible side of the trim part.

The trim part can be an interior roof lining of a motor vehicle, which is also referred to as a headliner. It is typically manufactured from a flexible material, such as a foam material. The second area is visible, in particular from a passenger interior of a motor vehicle comprising the component system. The trim support is an arbitrarily formed component for supporting at least one area of the trim part. In particular, it is connected to the trim part, on the one hand, and directly or indirectly to the vehicle body, on the other hand. It may be held, for example, by a pillar trim. The trim support may be made from a plastic, for example polyurethane.

The counter-pressure device, the trim part and/or the trim support can be disposed along at least one spatial direction for the purpose of implementing a force-fitting and/or form-fitting connection between the counter-pressure device and the trim part. At least one area of a trim part is fixed in such a way that it is secured against a displacement counter to the active direction of the first force. Fixing within the meaning of the invention means, in particular, the limiting of at least one degree of freedom.

The motor vehicle body component, which can also be referred to as a shell component, may be, for example, a sheet metal part, which is part of the roof structure or a side rail of the motor vehicle.

The first and/or the second force can be a continuously acting pressure force. The first force is used to fix the trim part in the defined position in relation to the motor vehicle body component.

In other words, at least one section of the trim support is disposed between a first and a second area of the trim part. The counter-pressure device is situated on the side of the first area facing away from the section of the trim support. The section of the trim support is arranged on the first area of the trim part for the purpose of applying the second force oriented in the opposite direction from the first force. In an embodiment, the first area of the trim part is clamped between the section of the trim support and the counter-pressure device. The section of the trim support may be an end of the trim support. For example, the trim part may be guided around this end.

The trim support and the trim part disposed thereon can be fixed by an external device, such as a column trim panel, in their position in relation to the counter-pressure device, so that the counter-pressure device applies or is able to apply the first force to the trim part. The external device may apply a third force, after which the first force acting in the opposite direction therefrom is implemented. Accordingly, the counter-pressure device functions as a counter-bearing for at least partially absorbing the third force applied to the trim part or to the trim support. The first force acting upon the trim part with the aid of the counter-pressure device results as a reaction to the third force.

The counter-pressure device may be part of the motor vehicle body component or be mechanically connected to such a component. It may be designed as a rigid component. The first force may be a counter-pressure implemented as a result of the second force applied by the trim support, which has the same magnitude as the second force and is oriented opposite thereto.

The described approach easily, permanently and cost-effectively facilitates the fixing of the trim part in a defined position. Due to the counter-pressure device, a displacement of the trim part is not possible, which effectively prevents the formation of a gap. Moreover, the approach according to the invention provides the advantage of easily and cost-effectively fastening the trim part to the trim support due to the first and second forces acting upon both sides. Additional components, such as spacers, are not necessary.

The trim part can be disposed in a U shape around a periphery of the trim support.

The trim part can be guided or bent around the periphery of the trim support. The two first and second areas of the trim part situated on different sides of the trim support may be disposed to run essentially in parallel to each other.

The periphery of the trim support limits them along at least one spatial direction. Periphery typically means an end of the trim support; however, the periphery may also be implemented as an opening in the trim support.

This example entails the advantage of a particularly easy assembly, since the trim part, for example a foam covering, may be easily bent around the periphery of the trim support and fixed in this manner.

The component system can also comprises the vehicle body component in relation to which the trim part is to be fixed in a defined position. At least one section of the motor vehicle body component forms the counter-pressure device.

In other words, a motor vehicle body component, in relation to which a gap is to be minimized, is itself used as the counter-pressure device. In this embodiment, at least one of the shell components that is present in any case, also referred to a flange, is lengthened in comparison to previously known approaches for the purpose of contacting the trim part under the application of the first force. The area contacting the trim part, or the lengthened area of the motor vehicle body component, faces in the direction of the trim support.

This example entails the advantage that a particularly easy minimizing of the gap is facilitated, in which no other components are needed to apply the force.

Multiple motor vehicle body components may be fixed one after the other and, in particular, essentially run in parallel, at least in sections. At least one section of at least one motor vehicle body component may form the counter-pressure device. It may be, for example, the motor vehicle part component which faces an interior of the motor vehicle in a proper arrangement of the component system in a motor vehicle.

At least one of the motor vehicle body components forming the roof structure, which are fixed to each other in a manner to increase strength, and which run in parallel to each other, in particular in sections, can be used as the counter-pressure device. In its section functioning as the counter-pressure device, the relevant motor vehicle body component typically also runs essentially in parallel to the other motor vehicle body components. The active direction of the first force may also be oriented in parallel thereto. The contact surface may be oriented essentially at right angles to the parallel section of the motor vehicle body component.

In other words, at least one of the vehicle body components contacts the area of the U-shaped section of the trim part in such a way that it implements a force-fitting and/or form-fitting connection to the trim part.

This example entails the advantage that a very stable counter-pressure device may be provided in a particularly easy manner.

The trim part can have a reduced thickness in an active area of the first force than in at least one area of the trim part adjacent to the active area. In particular, the reduced thickness is implemented as a result of the deformation induced by the application of the first force.

For example, the trim part may be implemented as a flexible foam part, as described. The latter may be compressed in the active area of the first force, i.e. between the trim support and the counter-pressure device.

The trim part may typically have a thickness which is reduced by at least 50% in relation to the thickness in the area adjacent to the active area, for example as a result of the effect of the first and second forces.

The active area of the first force and the area adjacent to the active area are situated, for example, in the first area of the trim part.

In this embodiment, the advantage is achieved that, in addition to minimizing the gap, the fixed arrangement of the trim part on the trim support is also ensured. A form fit between the counter-pressure device and the trim part is implemented.

The counter-pressure device and the trim support can be disposed at a distance A of less than 1 mm, in particular less than 0.5 mm, from each other in an active area of the first force.

As a result of the tight arrangement, the trim part situated therebetween, in particular its first area, can be compressed between the trim support and the counter-pressure device and firmly fixed thereby. This furthermore ensures that no visible gap occurs. Another advantage is that relative displacements of the trim part along the active direction of the first force are minimized in this manner.

The counter-pressure device can have a contact surface for applying the first force. The contact surface may have a length L between 5 mm and 30 mm, in particular between 10 mm and 20 mm. It may have a width between 0.8 mm and 2.2 mm, in particular between 1.2 mm and 1.8 mm. It may have a protruding height between 1 mm and 10 mm, in particular between 2 mm and 7 mm.

The counter-pressure device can be implemented as a protruding area of a sheet metal component having a thickness which may correspond to the width of the contact surface. The protruding height can be between 2.5 mm and 5 mm.

This example entails the advantage that the approach according to the invention may be provided with very slight changes to the geometry of a component, using a minimum amount of additional material.

The component system can furthermore comprise a holding device for holding the trim part and/or the trim support. The holding device is configured and disposed to apply a third force, in particular oriented in the opposite direction from the first force, to the trim part or the trim support.

In other words, the trim support, including the trim part disposed thereon, can be held in its position by a holding device. The counter-pressure device is used as a kind of counter-bearing, against which the trim support and the trim part are pressed, in particular with local deformation of the latter. The first force acting upon the trim part may be a force implemented as a result of the third force applied by the holding device.

The advantage is that the unit made up of the trim support and trim part is particularly easily firmly fixed in the vehicle.

Another aspect of the invention is a motor vehicle, in particular a passenger car. The latter comprises at least one component system according to the invention for fixing a trim part.

The trim part may be, for example, the headliner of the motor vehicle, which is position in relation to the at least one body component of the motor vehicle roof, for example between the C pillar and the D pillar.

In an embodiment of the motor vehicle, the latter has a pillar trim for covering a vehicle pillar, in particular a C pillar. The pillar trim forms a holding device for holding the trim part and/or the trim support. The holding device is configured and disposed to apply a third force, in particular oriented in the opposite direction from the first force, to the trim part or the trim support.

In other words, part of the trim support can be disposed between the motor vehicle body and the pillar trim and is fixed by the latter in its position in relation to the motor vehicle body. The pillar trim applies a third force to the trim support or the trim part, as a result of which the first area of the trim part contacts the counter-pressure device under the effect of the first force.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIG. 1 shows a section of the side connecting area of a motor vehicle headliner on the shell in the area of the C pillar, according to the conventional art;

FIG. 2 shows a perspective view of a connecting area similar to the one in FIG. 1, shown from the outside;

DETAILED DESCRIPTION

FIGS. 1 and 2 have already been discussed to explain the conventional art.

Figure 3:
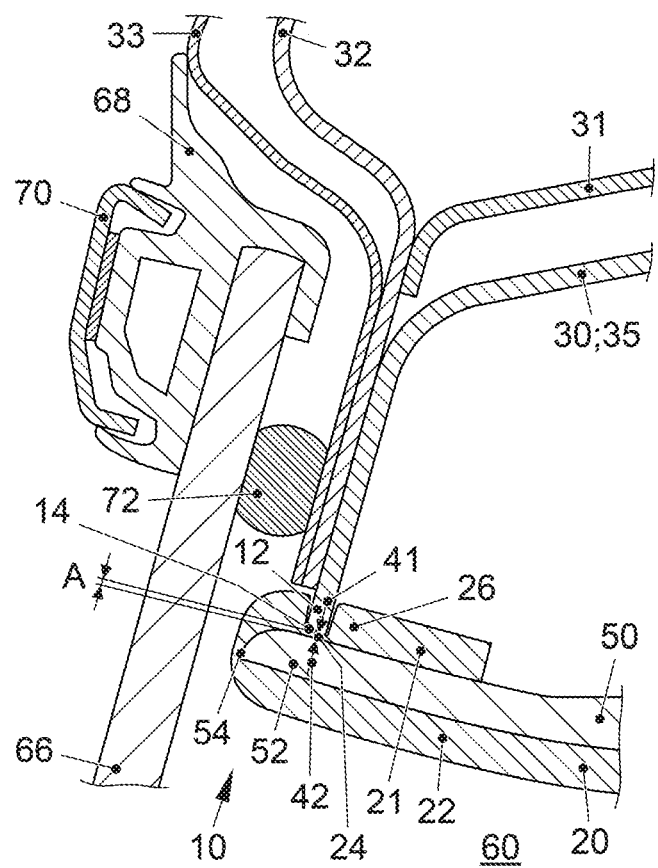
FIG. 3 shows a section of the side connecting area of a motor vehicle headliner on the shell in the area of the C pillar, including a component system according to the invention.

FIG. 3 shows a section of the side connecting area of a trim part 20, namely a headliner, on motor vehicle body component 35, namely an inner side part 30. Similarly to FIG. 1, the section runs perpendicularly to the longitudinal extension direction of the C pillar, viewed in the direction counter to the direction of travel of the motor vehicle, and shows the right side or passenger's side of the motor vehicle.

At the illustrated position the motor vehicle shell comprises, in addition to inner side part 30, a rear inner side part 31, a rear connecting part 32 and an outer side part 33. Together, they form part of the roof structure. In the outer area shown on the left, a sealing strip 68 partially faced with an outer molding 70 abuts outer side part 33. It holds side window 66, which is fastened to outer side part 33 with the aid of an adhesive bead 72.

Outer side part 33, rear connecting part 32 and inner side part 30 run in parallel to each other in sections in their lower areas and are fixed to each other in these areas. Outer side part 33 and connecting part 32 end in a shared front side, while inner side part 30 disposed adjacent thereto extends farther downwardly in the direction of trim part 20. Inner side part 30 is the motor vehicle body component 35 which faces interior 60 of the motor vehicle in the illustrated proper arrangement of component system 10 in a motor vehicle.

The lower section of inner side part 30, a motor vehicle body component 35, is designed as a counter-pressure device 12, which includes a contact surface 14 for applying a first force 41 to an underlying first area 21 of trim part 20. Together with trim part 20 and trim support 50, they form component system 10 according to the invention, which fixes trim part 20 in a defined position in relation to motor vehicle body component 35. Alternatively or additionally to inner side part 30, rear connecting part 32 and/or outer side par\ 33 could also be lengthened accordingly and used as counter-pressure device 12.

Similarly to FIG. 1, trim part 20, namely the headliner limiting motor vehicle interior 60 in the upward direction, is also held by a trim holder 50 in this case. The trim part is disposed in a U shape around periphery 54 of trim support 50 shown on the left, namely it is bent therearound. First area 21 of trim part 20 is situated above corresponding section 52 of trim support 50, and a second area 22 of trim part 20 is situated on the side of trim support 50 opposite first area 21, i.e. it is situated below section 52.

A section 52 of trim support 50 is disposed on the side of first area 21 of trim part 20 opposite counter-pressure device 12 for the purpose of applying a second force 42 oriented in the opposite direction from first force 41 to first area 21 of trim part 20. Trim part 20 is thus compressed or clamped from two sides, namely by trim support 50 and by counter-pressure device 12.

It is apparent that trim part 20 has a reduced thickness in active area 24 of first force 41, in which second force 42 also acts upon trim part 20, than in area 26 adjacent to active area 24. This is the result of a deformation of trim part 20, a foam part, induced by the application of first force 41 and second force 42. It is thus apparent that trim part 20 is, on the one hand, pressed against trim support 50 by the first force and is thus fastened thereto, and, on the other hand, an upward displacement of trim support 50 and trim part 20 is effectively prevented by counter-pressure device 12.

Counter-pressure device 12 and trim support 50 are disposed at a distance A of less than 0.5 mm from each other in active area 24 of first force 41 and the second force. Accordingly, the trim part is compressed to the aforementioned thickness in this area.

Figure 4:
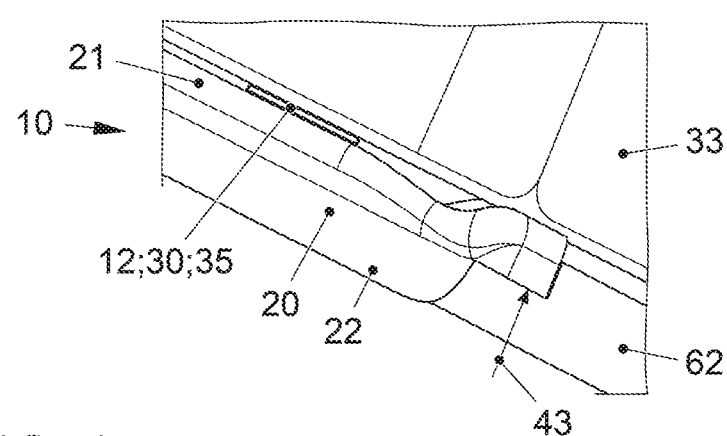
FIG. 4 shows a perspective view of a connecting area similar to the one in FIG. 3, shown from the outside.

Similarly to FIG. 2, FIG. 4 shows the pattern resulting from the structure according to the invention at the joint between trim part 20 and pillar trim 62, the trim of the C pillar in this case. Viewed from the outside through the side window, in the direction of the right side or driver's side of a motor vehicle comprising component system 10 according to the invention, the bent area of trim part 20 is shown from the outside. Area 21 of trim part 20 is at the top and second area 22 thereof is situated therebeneath.

A gap is apparent between upper first area 21 of trim part 20 and the motor vehicle shell, namely outer side part 33. A portion of counter-pressure device 12 is visible therein, which is implemented, as described, with the aid of a section of a motor vehicle body component 35, namely inner side part 30.

On the right side, it is apparent that trim part 20 bent around the trim support is inserted into pillar trim 62 or is held thereby. Pillar trim 62 functions as a holding device for holding trim part 20 or trim support 50. It is configured and disposed on trim part 20 or trim support 50 for the purpose of applying a third force 43 oriented in the opposite direction from first force 41 and thus holds the latter in the desired position.

Counter-pressure device 12 is used to effectively protect trim support 50 and trim part 20 against an upward displacement. The detent tab mentioned with reference to FIG. 2 may thus be properly engaged here, so that the gap shown in FIG. 2 does not occur in this case.

Figure 5:
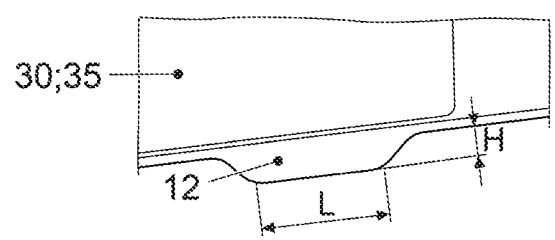
FIG. 5 shows a perspective detailed representation of a counter-pressure device of a component system according to the invention.

FIG. 5 shows counter-pressure device 12 designed as a section of motor vehicle body component 35, namely inner side part 30. The latter has an essentially planar contact surface 14, which is configured to apply first force 41 and has a length L of 15 mm and a height H of 3.6 mm. It is thus an elongation in areas of inner side part 30 manufactured from sheet metal and having a thickness of 1.5 mm.

The invention being thus described, it will be obvious that the same may be varied in many ways. Such variations are not to be regarded as a departure from the spirit and scope of the invention, and all such modifications as would be obvious to one skilled in the art are to be included within the scope of the following claims

What is claimed is:

1. A component system comprising:
    a motor vehicle body component;
    a trim part to be fixed in a defined position in relation to the motor vehicle body component;
    a trim support adapted to support the trim part; and
    a counter-pressure device adapted to apply a first force to a first area of the trim part, the counter-pressure device being formed by at least one section of the motor vehicle body component,
    wherein at least one section of the trim support is disposed on a side of the first area of the trim part opposite the counter-pressure device to apply a second force oriented in an opposite direction from the first force to the first area of the trim part, and wherein a second area of the trim part is disposed on a side of the trim support opposite the first area of the trim part thereby forming a visible side of the trim part.

2. The component system according to claim 1, wherein the trim part is disposed in a U shape around a periphery of the trim support.

3. The component system according to claim 1, wherein a multiple plurality of motor vehicle body parts are provided, the plurality of motor vehicle body parts and the motor vehicle body component being fixed to each other and running essentially in parallel to each other, at least in sections, wherein the motor vehicle body component faces an interior of the motor vehicle in the proper arrangement of the component system.

4. A motor vehicle comprising at least one component system for fixing a trim part according to claim 1.

5. The motor vehicle according to claim 4, wherein the motor vehicle comprises a pillar trim for covering a vehicle pillar, the pillar trim forming a holding device for holding the trim part and/or the trim support, the holding device being configured and disposed for applying a third force oriented in an opposite direction from the first force to the trim part or the trim support.

6. A component system comprising:
   a trim part to be fixed in a defined position in relation to a motor vehicle body component;
   a trim support adapted to support the trim part; and
   a counter-pressure device adapted to apply a first force to a first area of the trim part,
   wherein at least one section of the trim support is disposed on a side of the first area of the trim part opposite the counter-pressure device to apply a second force oriented in an opposite direction from the first force to the first area of the trim part,
   wherein a second area of the trim part is disposed on a side of the trim support opposite the first area of the trim part thereby forming a visible side of the trim part, and
   wherein the trim part has a reduced thickness in an active area of the first force compared to in at least one area of the trim part adjacent to the active area, the reduced thickness being implemented as a result of a deformation induced by the application of the first force.

7. The component system according to claim 6, wherein the counter-pressure device and the trim support are disposed at a distance A of less than 1 mm from each other in the active area of the first force.

8. The component system according to claim 6, wherein the counter-pressure device has a contact surface for applying the first force, the contact surface having a length L between 5 mm and 30 mm, a width between 0.8 mm and 2.2 mm, and a height between 2 mm.

9. The component system according to claim 6, wherein the counter-pressure device and the trim support are disposed at a distance A of less than 0.5 mm from each other in the active area of the first force.

10. The component system according to claim 6, wherein the counter-pressure device has a contact surface for applying the first force, the contact surface having a length L between 10 mm and 20 mm, a width between 1.2 mm and 1.8 mm, and a height between 2.5 mm and 5 mm.

11. A component system comprising:
   a trim part to be fixed in a defined position in relation to a motor vehicle body component;
   a trim support adapted to support the trim part; and
   a counter-pressure device adapted to apply a first force to a first area of the trim part,
   wherein at least one section of the trim support is disposed on a side of the first area of the trim part opposite the counter-pressure device to apply a second force oriented in an opposite direction from the first force to the first area of the trim part,
   wherein a second area of the trim part is disposed on a side of the trim support opposite the first area of the trim part thereby forming a visible side of the trim part, and
   wherein the component system further comprises a holding device for holding the trim part and/or the trim support, the holding device being configured and disposed for applying a third force oriented in an opposite direction from the first force to the trim part or the trim support.

* * * * *